United States Patent [19]

Kalina

[11] Patent Number: 5,440,882
[45] Date of Patent: Aug. 15, 1995

[54] METHOD AND APPARATUS FOR CONVERTING HEAT FROM GEOTHERMAL LIQUID AND GEOTHERMAL STEAM TO ELECTRIC POWER

[75] Inventor: Alexander I. Kalina, Hillsborough, Calif.

[73] Assignee: Exergy, Inc., Hayward, Calif.

[21] Appl. No.: 147,670

[22] Filed: Nov. 3, 1993

[51] Int. Cl.⁶ .................... F03G 4/00; F01K 23/04
[52] U.S. Cl. ..................... 60/641.2; 60/651; 60/671; 60/677; 60/655
[58] Field of Search ............. 60/641.2, 641.5, 651, 60/671, 677, 655

[56] References Cited

U.S. PATENT DOCUMENTS

| | | | |
|---|---|---|---|
| 3,505,810 | 4/1970 | Mamiya | 60/673 |
| 4,102,133 | 7/1978 | Anderson | 60/651 |
| 4,346,561 | 8/1982 | Kalina | 60/673 |
| 4,361,186 | 11/1982 | Kalina | 166/295 |
| 4,489,563 | 12/1984 | Kalina | 60/673 |
| 4,542,625 | 9/1985 | Bronicki | 60/655 |
| 4,548,043 | 10/1985 | Kalina | 60/673 |
| 4,586,340 | 5/1986 | Kalina | 60/673 |
| 4,604,867 | 8/1986 | Kalina | 60/653 |
| 4,732,005 | 3/1988 | Kalina | 60/673 |
| 4,763,480 | 8/1988 | Kalina | 60/649 |
| 4,899,545 | 2/1990 | Kalina | 60/673 |
| 4,982,568 | 1/1991 | Kalina | 60/649 |
| 4,996,846 | 3/1991 | Bronicki | 60/641.2 |
| 5,029,444 | 7/1991 | Kalina | 60/673 |
| 5,038,567 | 8/1991 | Mortiz | 60/641.5 |

FOREIGN PATENT DOCUMENTS

| | | |
|---|---|---|
| 0101244A3 | 8/1982 | European Pat. Off. . |
| 0065042A1 | 11/1982 | European Pat. Off. . |
| 0193184A1 | 2/1985 | European Pat. Off. . |
| 0372864 | 6/1990 | European Pat. Off. . |
| 0472020A1 | 2/1992 | European Pat. Off. . |
| 1546326 | 11/1968 | France . |

OTHER PUBLICATIONS

"Heber Geothermal Binary Demonstration Plant: Design, Construction, and Early Startup", Oct. 1987, Burns & McDonnell Engineering Company, Inc., Kansas City, Missouri.

Bliem, C. J., "Aspects of the Kalina Technology Applied to Geothermal Power Production", Spe. 1989, Idaho National Engineering Laboratory, Idaho Falls, Id.

Primary Examiner—Ira S. Lazarus
Assistant Examiner—L. Heyman
Attorney, Agent, or Firm—Fish & Richardson

[57] ABSTRACT

A method and apparatus for implementing a thermodynamic cycle that includes: (a) expanding a gaseous working stream, transforming its energy into usable form and producing a spent working stream; (b) heating a multicomponent oncoming liquid working stream by partially condensing the spent working stream; and (c) evaporating the heated working stream to form the gaseous working stream using heat produced by a combination of cooling geothermal liquid and condensing geothermal steam.

19 Claims, 2 Drawing Sheets

METHOD AND APPARATUS FOR CONVERTING HEAT FROM GEOTHERMAL LIQUID AND GEOTHERMAL STEAM TO ELECTRIC POWER

BACKGROUND OF THE INVENTION

This invention relates to a method and apparatus for transforming thermal energy from a geothermal heat source consisting of a mixture of geothermal liquid and geothermal steam ("geofluid") into electric power. This invention further relates to utilizing the energy potential of both geothermal liquid and geothermal steam in one integrated system.

Geothermal heat sources can generally be divided into two groups. In the first group are "liquid-dominated" heat sources that produce mostly hot geothermal liquid (brine). In the second group are "steam-dominated" heat sources that produce mostly geothermal steam with some geothermal liquid.

Methods for converting the thermal energy released by geothermal heat sources into electric power present an important and growing area of energy generation. Geothermal power plants generally belong to one of two categories, namely, steam plants and binary plants.

In steam plants, the geothermal source is utilized directly to produce steam (e.g., by throttling and flashing geothermal liquid). That steam is then expanded in a turbine, producing power. In binary plants, heat extracted from the geothermal liquid is used to evaporate a working fluid that circulates within the power cycle. The working fluid is then expanded in a turbine, producing power.

Steam plants are generally used for steam-dominated geothermal heat sources, while binary plants are generally used for liquid-dominated geothermal heat sources. U.S. Pat. No. 4,982,568 describes a method and apparatus for transforming thermal energy from geothermal liquid into electrical power in a binary plant. This method increases efficiency by using a thermodynamic cycle with a multi-component working fluid and internal recuperation.

SUMMARY OF THE INVENTION

In a first aspect, the invention features a method of implementing a thermodynamic cycle that includes the steps of:
expanding a gaseous working stream, transforming its energy into usable form and producing a spent working stream;
heating a multicomponent oncoming liquid working stream by partially condensing the spent working stream; and
evaporating the heated working stream to form the gaseous working stream using heat produced by a combination of cooling geothermal liquid and condensing geothermal steam.

In preferred embodiments, the liquid working stream is superheated following evaporation using heat produced by cooling geothermal liquid to form the gaseous working stream. The multicomponent oncoming liquid working stream is preferably preheated by partially condensing the spent working stream, after which it is divided into first and second substreams. The first substream is then partially evaporated using heat produced by partially condensing the spent working stream, while the second substream is partially evaporated using heat produced by cooling geothermal liquid. The partially evaporated first and second substreams are then combined and evaporated to form the gaseous working stream using heat produced by a combination of cooling geothermal liquid and condensing geothermal steam. The difference between the boiling temperature of the second substream and the temperature of the geothermal liquid preferably is greater than the difference between the boiling temperature of the first substream and the temperature of the condensed spent working stream.

The geothermal steam is expanded, transforming its energy into usable form and producing a spent geothermal stream. The spent geothermal stream is then condensed to heat and partially evaporate the liquid working stream, after which it is combined with the geothermal liquid and used for further evaporation of the liquid working stream. Where the geothermal steam content of the geofluid is relatively high, it is preferable to perform multiple expansions of the geothermal steam. Thus, in one preferred embodiment, the spent geothermal stream produced by a first expansion of geothermal steam is divided into first and second geothermal substreams. The first geothermal substream is condensed to heat and partially evaporate the liquid working stream, and then combined with the geothermal liquid. The second geothermal substream is expanded, transforming its energy into usable form and producing a spent geothermal substream, which is then condensed to heat and partially evaporate the liquid working stream. The spent geothermal substream is then combined with the geothermal liquid.

In a second aspect, the invention features apparatus for implementing a thermodynamic cycle that includes:
means for expanding a gaseous working stream, transferring its energy into usable form and producing a spent stream;
a heat exchanger for partially condensing the spent stream and for transferring heat from the spent stream to an oncoming multicomponent liquid working stream;
a separator for separating geofluid into geothermal liquid and geothermal steam; and
a multiplicity of heat exchangers for cooling geothermal liquid and condensing geothermal steam, and for transferring heat from the geothermal liquid and geothermal steam to evaporate the liquid working stream and form the gaseous working stream.

In preferred embodiments, the apparatus includes a heat exchanger for cooling geothermal liquid and transferring heat from the geothermal liquid to superheat the liquid working stream and form the gaseous working stream. The apparatus also preferably includes a stream separator for dividing the heated liquid working stream into first and second substreams; a heat exchanger for partially condensing the spent working stream and transferring heat from the spent working stream to partially evaporate the first substream; a heat exchanger for cooling the geothermal liquid and transferring heat from the cooled geothermal liquid to partially evaporate the second substream; and a stream mixer for combining the partially evaporated first and second substreams.

The apparatus further preferably includes means for expanding geothermal steam, transforming its energy into usable form and producing a spent geothermal stream; a heat exchanger for condensing the spent geothermal stream and transferring heat from the spent geothermal stream to partially evaporate the liquid working stream; and a stream mixer for combining the spent geothermal stream with the geothermal liquid. To accommodate geofluids with relatively high geothermal steam content, the apparatus further includes a stream separator for dividing the spent geothermal stream produced in the first expansion into first and second geothermal streams; a heat exchanger for condensing the first geothermal substream and transferring heat from the first geothermal substream to partially evaporate the liquid working stream; a stream mixer for combining the first geothermal substream with the geothermal liquid; means for expanding the second geothermal substream, transforming its energy into usable form and producing a spent geothermal substream; a heat exchanger for condensing the spent geothermal substream and transferring heat from the spent geothermal substream to partially evaporate the liquid working stream; and a stream mixer for combining the spent geothermal substream with the geothermal liquid.

The invention provides an integrated system that utilizes the energy potentials of both geothermal steam and geothermal liquid (brine). The system can handle practically all geothermal resources in almost any proportion between steam and liquid. Geofluids from different wells having different temperatures and different proportions of steam and liquid may be used as well. Higher outputs and efficiencies are achieved relative to systems in which geothermal liquid and geothermal steam are utilized separately. In addition, the efficiency and output are higher relative to steam power systems that are currently used for utilization of such geothermal resources.

Because the heat source for the thermodynamic cycle involves a combination of cooling geothermal liquid and condensing geothermal steam, only a one stage expansion of the working fluid is necessary (as opposed to two stages of expansion with intermediate reheat). Moreover, by splitting the liquid working fluid into two substreams, one of which is partially evaporated by heat transferred from cooling geothermal liquid and the other of which is partially evaporated by heat transferred from partially condensing spent working fluid, geofluid having a high degree of mineralization (which can be cooled only to relatively high temperatures) can be used as well.

Other features and advantages of the invention will be apparent from the following description of the preferred embodiments thereof, and from the claims.

DESCRIPTION OF THE PREFERRED EMBODIMENTS

Figure 1:
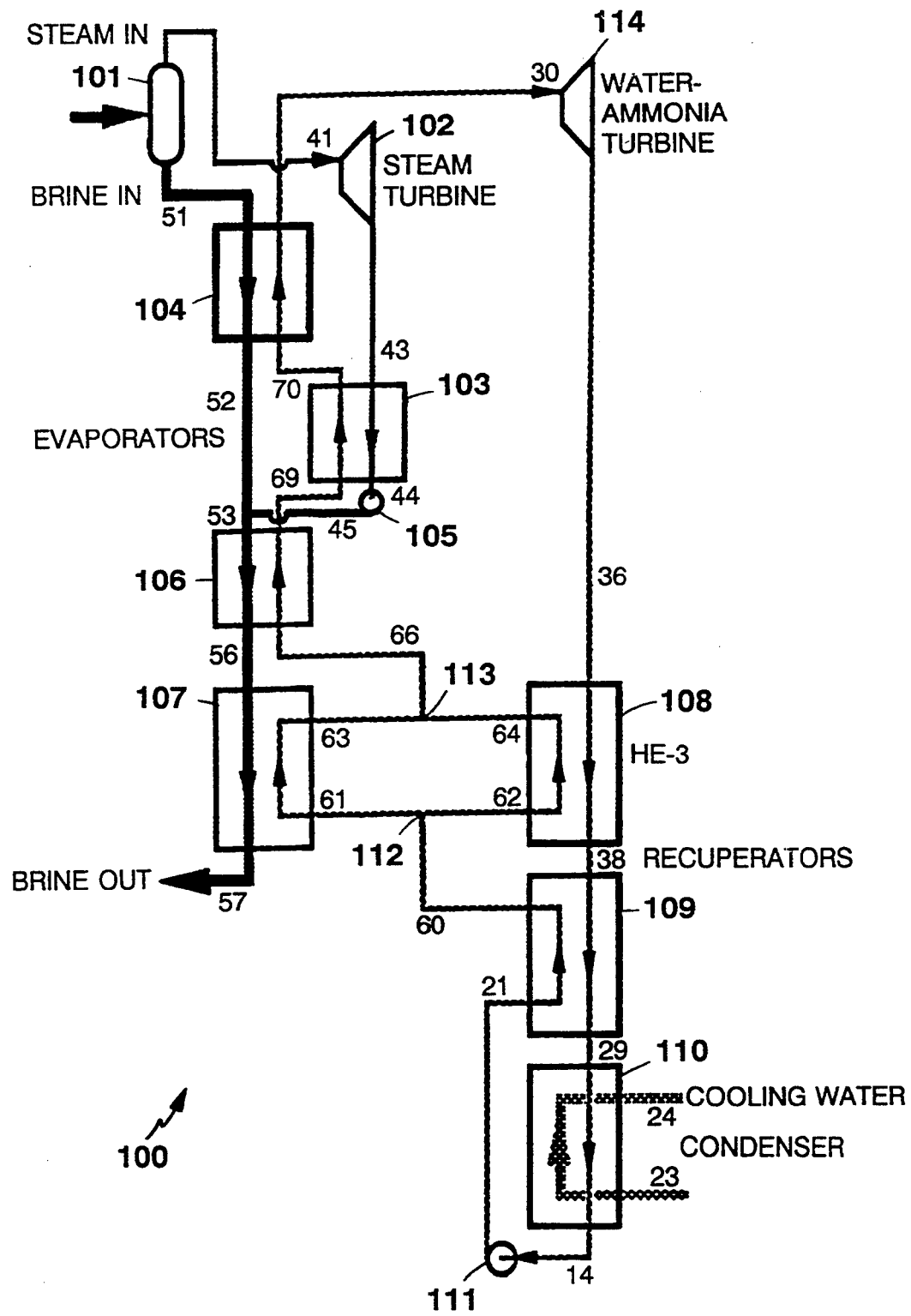
FIG. 1 is a schematic representation of one embodiment of the method and apparatus of the present invention.

The schematic shown in FIG. 1 shows an embodiment of preferred apparatus that may be used in the above-described cycle. Specifically, FIG. 1 shows a system 100 that includes a gravity separator 101, a preheater in the form of a heat exchanger 109, a superheater in the form of a heat exchanger 104, and a boiler in the form of heat exchangers 103, 106, 107, and 108. In addition, the system 100 includes turbines 102 and 114, pumps 105 and 111, and condenser 110. Further, the system 100 includes stream separator 112 and stream mixer 113.

The condenser 110 may be any type of known heat rejection device. For example, the condenser 110 may take the form of a heat exchanger, such as a water cooled system, or another type of condensing device.

As shown in FIG. 1, geofluid consisting of geothermal liquid (brine) and geothermal steam leaving the geothermal well is sent into gravity separator 101, where geothermal liquid and geothermal steam are separated. Steam leaves separator 101 with parameters as at point 41, and liquid leaves separator 101, with parameters as at point 51. Thereafter, the steam is sent into steam turbine 102 where it expands, producing power which is converted into electric power, and leaves turbine 102 with parameters as at point 43. The steam is then sent into heat exchanger 103 where it condenses, releasing its heat of condensation and being completely condensed. The condensate leaves heat exchanger 103 with parameters as at point 44. Heat from the condensation of the steam is transferred in heat exchanger 103 to the working fluid of the power cycle.

The geothermal liquid, with parameters as at point 51, is cooled in heat exchanger 104, which it leaves with parameters as at point 52 and transfers heat to the working fluid of the power cycle. The temperature of the steam condensate at point 44 is substantially equal to the temperature of the geothermal liquid at point 52. The steam condensate with parameters as at point 44 is pumped by a pump 105 to a pressure equal to that of the geothermal liquid at point 52, obtaining parameters as at point 45. Thereafter, the steam condensate with parameters corresponding to point 45 is combined with the geothermal liquid with parameters corresponding to point 52, obtaining parameters as at point 53.

The combined liquid having parameters as at point 53 passes through heat exchanger 106 where it is further cooled, releasing heat which is transferred to the working fluid of the power cycle and obtaining parameters as at point 56. Finally, liquid with parameters as at point 56 passes through heat exchanger 107 where it is further cooled, releasing heat which is transferred to the working fluid of the power cycle and obtaining parameters as at point 57. Thereafter, geothermal liquid is removed from the system and reinjected into the geothermal strata.

From the above discussion, it can be seen that the thermodynamic power cycle according to the invention utilizes two sources of geothermal heat, i.e., heat released in the process of condensation of geothermal steam and heat released by the cooling of liquid and steam condensate (geothermal liquid). The power cycle operates as follows.

The fully condensed working fluid of the power cycle with parameters as at point 21 passes through a recuperative preheater 109 where it is preheated up to boiling temperature and exits preheater 109 with parameters as at point 60. Thereafter, the working fluid is divided into two substreams at stream separator 112 having parameters, correspondingly, as at points 61 and 62. The first substream with parameters as at point 61 passes through heat exchanger 107, where it is heated by a stream of liquid geofluid and partially evaporated. It leaves heat exchanger 107 with parameters as at point 63.

The second substream having parameters as at point 62 passes through heat exchanger 108 where it is also heated and partially evaporated. It leaves heat exchanger 108 with parameters as at point 64. Thereafter, both substreams are combined at stream mixer 113, obtaining parameters as at point 66. The combined substreams are then sent into heat exchanger 106 where further evaporation occurs using heat transferred from a stream of liquid geofluid.

The temperature difference between the boiling point of the working fluid having parameters at point 62 and the temperature of the condensing working fluid stream at point 38 is minimized. However, the temperature difference between the initial boiling temperature and final temperature of the geothermal liquid used for evaporation in heat exchanger 107 can significantly exceed the minimum temperature difference between points 62 and 38 in heat exchanger 108. Thus, it is possible to optimize temperature and corresponding pressure at point 60 even where the geothermal liquid can only be cooled to relatively high temperatures because of a high degree of mineralization.

The working fluid leaves heat exchanger 106 having parameters as at point 69 and enters heat exchanger 103, where evaporation is completed using heat produced by condensation of the geothermal steam. The working fluid leaves heat exchanger 103 with parameters as at point 68 and enters heat exchanger 104, where it is superheated by a stream of geothermal liquid. Thereafter, the working fluid, which leaves heat exchanger 104 with parameters as at point 30, enters turbine 114 where it is expanded, producing power. The expanded working fluid stream then leaves turbine 114 with parameters as at point 36.

The expanded working fluid at point 36 is usually in the form of a dry or a wet saturated vapor. It then passes through heat exchanger 108 where it is partially condensed. The heat released during condensation is utilized for an initial boiling of the liquid working fluid. Thereafter, the expanded working fluid leaves heat exchanger 108 with parameters as at point 38 and passes through heat exchanger 109, where it is further condensed. The heat of condensation is utilized to preheat oncoming working fluid. The partially condensed working fluid with parameters as at point 29 leaves heat exchanger 109 and enters heat exchanger 110, where it is fully condensed, obtaining parameters as at point 14.

Condensation can be provided by cooling water, cooling air, or any other cooling medium. The condensed working fluid is then pumped to a higher pressure by pump 111, obtaining parameters as at point 21. The cycle is then repeated.

The pressure at point 43 to which geothermal steam is expanded is chosen to achieve maximum total power output from both steam turbine 102 and working fluid turbine 114. The composition of the multicomponent working fluid (which includes a lower boiling point fluid and a higher boiling point fluid) is similarly chosen to maximize total power output. Specifically, the composition is chosen such that the temperature at which the expanded working fluid having parameters at point 36 condenses is higher than the temperature at which the same working fluid having parameters at point 60 boils. Examples of suitable multicomponent working fluids include an ammonia-water mixture, two or more hydrocarbons, two or more freons, mixtures of hydrocarbons and freons, or the like. In a particularly preferred embodiment, a mixture of water and ammonia is used. The multicomponent working stream preferably includes about 55% to about 95% of the low-boiling component.

Preferred parameters for the points corresponding to the points set forth in FIG. 1 are presented in Table I for a system having a water-ammonia working fluid stream. From the data it follows that the proposed system increases output in comparison with a traditional steam system by 1.55 times, and in comparison with a system that separately utilizes heat from brine and steam by 1.077 times.

TABLE I

| #  | P psiA | X      | T °F.  | H BTU/lb | G/G30  | Flow lb/hr | Phase      |
|----|--------|--------|--------|----------|--------|------------|------------|
| 14 | 112.71 | .7854  | 78.00  | −12.37   | 1.0000 | 2,682,656  | SatLiquid  |
| 21 | 408.10 | .7854  | 78.00  | −11.12   | 1.0000 | 2,682,656  | Liq 90°    |
| 23 | •      | Water  | 70.00  | 38.00    | 14.8173| 39,749,694 |            |
| 24 | •      | Water  | 94.70  | 62.70    | 14.8173| 39,749,694 |            |
| 29 | 113.01 | .7854  | 133.62 | 353.56   | 1.0000 | 2,682,656  | Wet .4037  |
| 30 | 385.10 | .7854  | 386.80 | 811.71   | 1.0000 | 2,682,656  | Vap 67°    |
| 36 | 113.61 | .7854  | 240.46 | 724.15   | 1.0000 | 2,682,656  | Wet .0321  |
| 38 | 113.31 | .7854  | 170.00 | 450.61   | 1.0000 | 2,682,656  | Wet .2998  |
| 40 | 113.61 | .7854  | 244.90 | 755.37   | 1.0000 | 2,682,656  | SatVapor   |
| 41 | 224.94 | Steam  | 391.80 | 1200.54  | .1912  | 513,000    | SatVapor   |
| 43 | 84.77  | Steam  | 316.09 | 1132.63  | .1912  | 513,000    | Vap 0°     |
| 44 | 84.77  | Steam  | 316.09 | 286.24   | .1912  | 513,000    | SatLiquid  |
| 45 | 224.94 | Steam  | 316.09 | 286.42   | .1912  | 513,000    | Vap 0°     |
| 51 | •      | Brine  | 391.80 | 305.83   | 1.4143 | 3,794,000  |            |
| 52 | •      | Brine  | 316.09 | 241.48   | 1.4143 | 3,794,000  |            |
| 53 | •      | Brine  | 316.09 | 241.48   | 1.6055 | 4,307,000  |            |
| 56 | •      | Brine  | 240.46 | 177.19   | 1.6055 | 4,307,000  |            |
| 57 | •      | Brine  | 170.00 | 117.30   | 1.6055 | 4,307,000  |            |
| 60 | 393.10 | .7854  | 165.00 | 85.93    | 1.0000 | 2,682,656  | SatLiquid  |
| 61 | 391.10 | .7854  | 235.46 | 455.64   | .2601  | 697,740    | Wet .3412  |
| 62 | 391.10 | .7854  | 235.46 | 455.64   | .7399  | 1,984,916  | Wet .3412  |
| 66 | 391.10 | .7854  | 235.46 | 455.64   | 1.0000 | 2,682,656  | Wet .3412  |
| 69 | 389.10 | .7854  | 269.56 | 558.84   | 1.0000 | 2,682,656  | Wet .2248  |
| 70 | 387.10 | .7854  | 311.08 | 720.70   | 1.0000 | 2,682,656  | Wet .05    |

Where the initial geofluid leaving the geothermal well contains a relatively large quantity of steam, it is preferable to expand and then condense the geothermal steam in two or more steps, rather than in one step as shown in FIG. 1. In such a case, heating and evaporation of the working fluid is performed alternately by cooling the geothermal liquid and condensing the geothermal steam.

Figure 2:
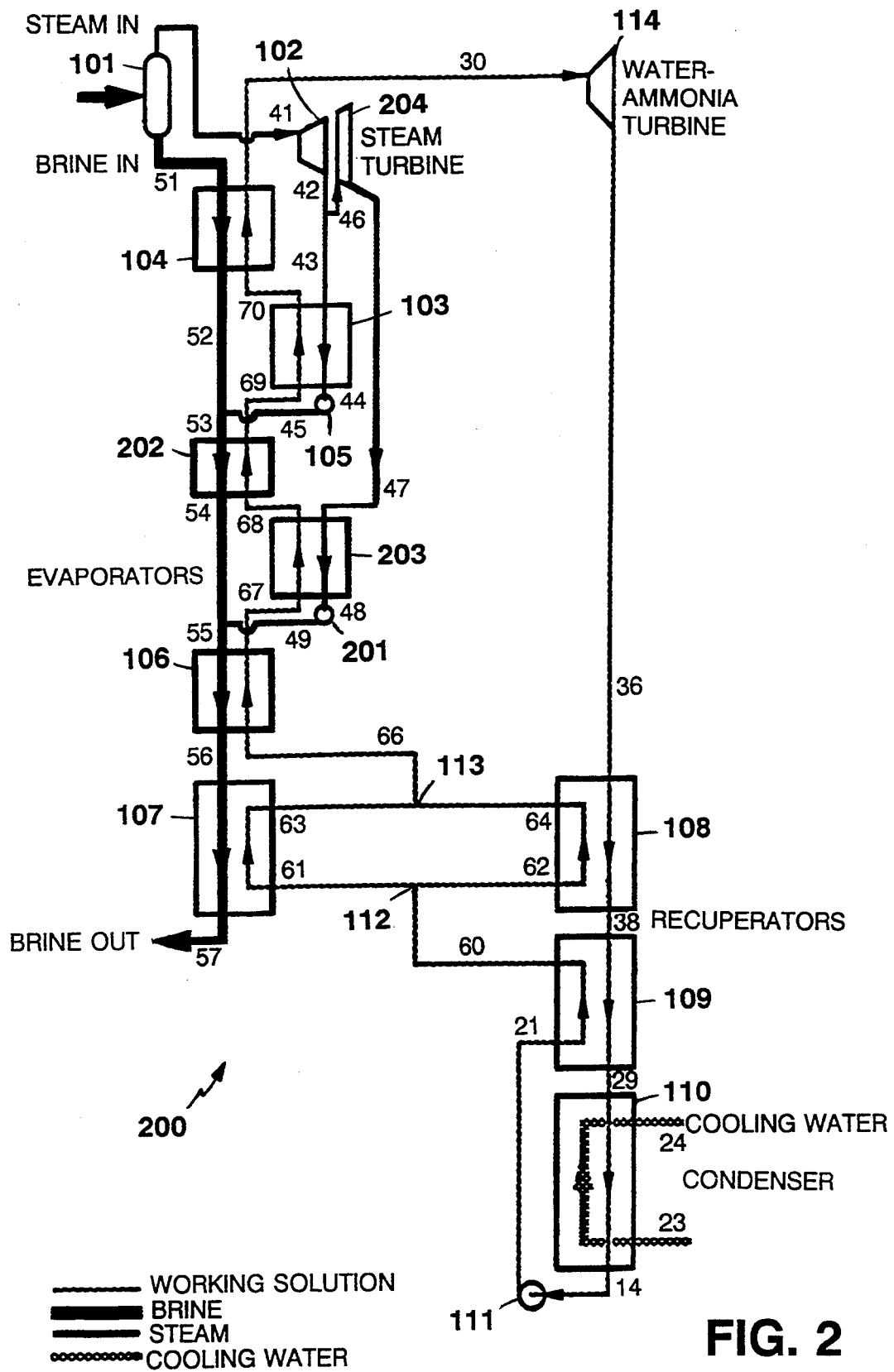
FIG. 2 is a schematic representation of a second embodiment of the method and apparatus of the present invention.

In FIG. 2, a system which includes two stages of expansion of geothermal steam is presented. It differs from the system shown in FIG. 1 by the fact that after the first stage of expansion, part of the expanded steam with parameters as at 43 is sent into heat exchanger 103. A portion of partially expanded steam is further expanded in a second steam turbine 204 and then condensed in a second steam condenser shown as heat exchanger 203, from which it is pressurized via pump 201 and then recombined with geothermal liquid. Geothermal liquid is used to heat the working fluid of the power cycle between those two steam condensers in heat exchanger 204.

While the present invention has been described with respect to a number of preferred embodiments, those skilled in the art will appreciate a number of variations and modifications of those embodiments. For example, the number of heat exchangers may be increased or decreased. In addition, the geothermal steam may undergo more than two expansions depending on the steam content of the geofluid. Thus, it is intended that the appended claims cover all such variations and modifications as fall within the true spirit and scope of the present invention.

What is claimed is:

1. A method of implementing a thermodynamic cycle comprising the steps of:

expanding a gaseous working stream, transforming its energy into usable form and producing a spent working stream;

heating a multicomponent oncoming liquid working stream by partially condensing the spent working stream, thereby forming a preheated liquid working stream; and further comprising the steps of:

dividing the preheated liquid working stream into first and second substreams;

partially evaporating the first substream using heat produced by partially condensing the spent working stream;

partially evaporating the second substream using heat produced by cooling geothermal liquid;

combining the partially evaporated first and second substreams; and evaporating the partially evaporated first and second substreams to form the gaseous working stream using heat produced by a combination of cooling geothermal liquid and condensing geothermal steam.

2. The method of claim 1 wherein the initial boiling temperatures of the first and second substreams are the same, and the difference between the initial boiling temperature of the second substream and the temperature of the geothermal liquid is greater than the difference between the initial boiling temperature of the first substream and the temperature of the condensed spent working stream.

3. A method of implementing a thermodynamic cycle comprising the steps of:

expanding a gaseous working stream, transforming its energy into usable form and producing a spent working stream;

heating a multicomponent oncoming liquid working stream by partially condensing the spent working stream; and evaporating the heated working stream to form the gaseous working stream using heat produced by a combination of cooling geothermal liquid and condensing geothermal steam, further comprising the step of:

expanding geothermal steam, transforming its energy into usable form and producing a spent geothermal stream; and wherein said evaporating includes:

condensing the spent geothermal stream to heat and partially evaporate the heated working stream; and further comprising:

combining the spent geothermal stream with the cooled geothermal liquid.

4. A method of implementing a thermodynamic cycle comprising the steps of:

expanding a gaseous working stream, transforming its energy into usable form and producing a spent working stream;

heating a multicomponent oncoming liquid working stream by partially condensing the spent working stream; and evaporating the heated working stream to form the gaseous working stream using heat produced by a combination of cooling geothermal liquid and condensing geothermal steam, further comprising the steps of:

expanding geothermal steam, transforming its energy into usable form and producing a spent geothermal stream;

dividing the spent geothermal stream into first and second geothermal substreams; and wherein said evaporating includes:

condensing the first geothermal substream to heat and partially evaporate the heated working stream; and further comprising:

combining the first geothermal substream with the geothermal liquid;

expanding the second geothermal substream, transforming its energy into usable form and producing a further spent geothermal substream; and wherein said evaporating includes:

condensing the further spent geothermal substream to heat and partially evaporate the heated working stream; and further comprising:

combining the further spent geothermal substream with the geothermal liquid.

5. A method of implementing a thermodynamic cycle comprising the steps of:

expanding a gaseous working stream, transforming its energy into usable form and producing a spent working stream;

preheating an oncoming multicomponent liquid working stream by partially condensing the spent working stream;

dividing the preheated liquid working stream into first and second substreams;

partially evaporating the first substream using heat produced by partially condensing the spent working stream;

partially evaporating the second substream using heat produced by cooling geothermal liquid;

combining the partially evaporated first and second substreams;

evaporating the partially evaporated first and second substreams using heat produced by a combination of cooling geothermal liquid and condensing geothermal stream; and superheating the evaporated liquid working stream using heat produced by cooling geothermal liquid to form the gaseous working stream.

6. The method of claim 5 wherein the initial boiling temperatures of the first and second substreams are the same, and the difference between the initial boiling temperature of the second substream and the temperature of the geothermal liquid is greater than the difference between the initial boiling temperature of the first substream and the temperature of the condensed spent working stream.

7. The method of claim 5 further comprising the step of:
expanding geothermal steam, transforming its energy into usable form and producing a spent geothermal stream; and wherein said evaporating includes:
condensing the spent geothermal stream to heat and partially evaporate the liquid working stream; and further comprising:
combining the spent geothermal stream with the geothermal liquid.

8. The method of claim 5 further comprising the steps of:
expanding geothermal steam, transforming its energy into usable form and producing a spent geothermal stream;
dividing the spent geothermal stream into first and second geothermal substreams; and wherein said evaporating includes:
condensing the first geothermal substream to heat and partially evaporate the liquid working stream; and further comprising:
combining the first geothermal substream with the geothermal liquid;
expanding the second geothermal substream, transforming its energy into usable form and producing a spent geothermal substream; and wherein said evaporating further includes:
condensing the spent geothermal substream to heat and partially evaporate the liquid working stream; and further comprising:
combining the spent geothermal substream with the geothermal liquid.

9. Apparatus for implementing a thermodynamic cycle comprising:
means for expanding a gaseous working stream, transferring its energy into usable form and producing a spent stream;
a first heat exchanger connected to receive said spent stream for partially condensing the spent stream and for transferring heat from the spent stream to an oncoming multicomponent liquid working stream, resulting in a heated liquid working stream;
a stream separator connected to receive said heated liquid working stream from said first heat exchanger for dividing the heated liquid working stream into first and second substreams;
a second heat exchanger connected to receive said first substream from said stream separator and to receive said spent stream from said means for expanding and to provide said spent stream to said first heat exchanger for partially condensing the spent working stream and transferring heat from the spent working stream to partially evaporate the first substream;
a third heat exchanger connected to receive said second substream from said stream separator and to receive a geothermal liquid for cooling the geothermal liquid and transferring heat from the geothermal liquid to partially evaporate the second substream; and
a stream mixer connected to receive and combine the partially evaporated first and second substreams from said second and third heat exchangers, resulting in a partially evaporated recombined working stream;
a geofluid separator for separating geofluid into geothermal liquid and geothermal steam; and
a multiplicity of heat exchangers connected to receive said geothermal liquid and said geothermal steam from said geofluid separator and said partially evaporated recombined working stream for cooling said geothermal liquid and condensing said geothermal steam, and for transferring heat from the geothermal liquid and geothermal steam to evaporate said partially evaporated working stream and form the gaseous working stream, said further heat exchangers being connected so that said gaseous working stream is provided to said means for expanding and said geothermal liquid is provided to said third heat exchanger.

10. Apparatus for implementing a thermodynamic cycle comprising:
means for expanding a gaseous working stream, transferring its energy into usable form and producing a spent stream;
a first heat exchanger connected to receive said spent stream for partially condensing the spent stream and for transferring heat from the spent stream to an oncoming multicomponent liquid working stream;
a geofluid separator for separating geofluid into geothermal liquid and geothermal steam;
first means for expanding geothermal steam from said geofluid separator, transforming its energy into usable form and producing a first spent geothermal stream;
a stream separator for dividing the first spent geothermal stream from said first means for expanding geothermal steam into first and second geothermal substreams;
a second heat exchanger connected to said stream separator for receiving the first geothermal substream and condensing the first geothermal substream into a condensed first geothermal substream and transferring heat from the first geothermal substream to partially evaporate the working stream;
a first stream mixer connected to combine the condensed first geothermal substream with the geothermal liquid;
second means for expanding the second geothermal substream, transforming its energy into usable form and producing a second spent geothermal substream;
a third heat exchanger connected to said second means for expanding the second geothermal substream for receiving the second geothermal substream and condensing the second spent geothermal substream and transferring heat from the second spent geothermal substream to partially evaporate the working stream;
a second stream mixer connected to combine the second spent geothermal substream with the geothermal liquid, and
a multiplicity of further heat exchangers connected to receive said geothermal liquid for cooling said geothermal liquid and for transferring heat from the geothermal liquid to the working stream to heat and evaporate the working stream and form the gaseous working stream, said further heat exchangers being connected so that said gaseous working stream is provided to said means for expansion.

11. Apparatus for implementing a thermodynamic cycle comprising:
   means for expanding a gaseous working stream, transferring its energy into usable form and producing a spent stream;
   a first heat exchanger connected to receive said spent stream for partially condensing the spent stream and for transferring heat from the spent stream to an oncoming multicomponent liquid working stream, resulting in a preheated liquid working stream;
   a geofluid separator for separating geofluid into geothermal liquid and geothermal steam;
   a stream separator connected to receive said preheated liquid working stream for dividing the heated liquid working stream into first and second substreams;
   a second heat exchanger connected between said means for expanding and said first heat exchanger for partially condensing the spent working stream and also connected to said stream separator for transferring heat from the spent working stream to partially evaporate the first substream;
   a third heat exchanger for cooling the geothermal liquid and connected to said stream separator for transferring heat from the cooled geothermal liquid to partially evaporate the second substream;
   a stream mixer connected to said second and third heat exchangers for combining the partially evaporated first and second substreams;
   a multiplicity of further heat exchangers connected to said geofluid separator to receive said geothermal liquid and said geothermal steam for cooling said geothermal liquid and condensing said geothermal steam, and for transferring heat from the geothermal liquid and geothermal steam to evaporate the working stream; and
   a still further heat exchanger for cooling geothermal liquid and transferring heat from the geothermal liquid to superheat the working stream and form the gaseous working stream.

12. The apparatus of claim 11 further comprising:
   means for expanding said geothermal steam from said geofluid separator, transforming its energy into usable form and producing a spent geothermal stream;
   and where one of said further heat exchangers is connected to receive said spent geothermal stream and condense the spent geothermal stream and transfer heat from the spent geothermal stream to partially evaporate the working stream, resulting in a condensed geothermal stream; and
   a stream mixer connected to receive said condensed geothermal stream from the last mentioned heat exchanger for combining the condensed geothermal stream with the geothermal liquid.

13. The apparatus of claim 11 comprising:
   means for expanding said geothermal steam from said geofluid separator, transforming its energy into usable form and producing a first spent geothermal stream;
   a spent geothermal stream separator for dividing the first spent geothermal stream from said means for expanding said geothermal steam into first and second geothermal substreams; and wherein one of said multiplicity of further heat exchangers comprises:
   a heat exchanger connected to said spent geothermal stream separator for receiving the first geothermal substream and condensing the first geothermal substream into a condensed first geothermal substream and transferring heat from the first geothermal substream to partially evaporate the working stream; and further comprising:
   a first geothermal stream mixer connected to combine the condensed first geothermal substream with the geothermal liquid;
   means for expanding the second geothermal substream, transforming its energy into usable form and producing a second spent geothermal substream; and wherein one of said multiplicity of further heat exchangers comprises:
   a heat exchanger connected to said means for expanding the second geothermal substream for receiving the second spent geothermal substream and condensing the second spent geothermal substream and transferring heat from the second spent geothermal substream to partially evaporate the working stream; and
   a second geothermal stream mixer for combining the second spent geothermal substream with the geothermal liquid.

14. A method of implementing a thermodynamic cycle comprising the steps of:
   separating a geofluid into geothermal liquid and geothermal steam,
   heating a working stream to its highest temperature in a working cycle by cooling said geothermal liquid, resulting in a cooled geothermal liquid and a gaseous working stream of highest temperature,
   expanding said geothermal steam, transforming its energy into usable form, and producing a spent geothermal stream,
   heating said working stream to a middle temperature by condensing said spent geothermal stream, resulting in a condensed geothermal stream having a temperature that is substantially equal to the temperature of said cooled geothermal liquid,
   combining said cooled geothermal liquid and said condensed geothermal stream to provide a recombined geothermal stream,
   heating said working stream from a lower temperature below said middle temperature by cooling said recombined geothermal stream,
   expanding said gaseous working stream of highest temperature, transforming its energy into usable form, and producing a spent working stream, and
   condensing said spent working stream to provide an oncoming liquid working stream.

15. The method of claim 14 wherein said working stream is a multicomponent fluid, and further comprising preheating said oncoming liquid working stream by partially condensing said spent working stream.

16. Apparatus for implementing a thermodynamic cycle comprising:
   a geofluid separator for separating geofluid into geothermal liquid and geothermal steam,
   a first heat exchanger connected to receive said geothermal liquid from said geofluid separator and to receive a working stream and to output a gaseous working stream of highest temperature and a cooled geothermal liquid, means for expanding said geothermal steam from said geofluid separator, transforming its energy into usable form and producing a spent geothermal stream, a second heat exchanger connected to receive said spent geothermal stream from said means for expanding and to receive said working stream at a lower temperature, said second heat exchanger condensing said spent geothermal stream and heating said working stream at said lower temperature, resulting in a condensed geothermal stream having a temperature that is substantially equal to the temperature of said cooled geothermal liquid and a working stream heated to a middle temperature that is lower than said highest temperature, a stream mixer connected to receive and combine said condensed geothermal stream from said second heat exchanger and said cooled geothermal liquid from said first exchanger and provide a recombined geothermal stream, a third heat exchanger connected to receive said recombined geothermal stream and connected to receive said working fluid and to heat said working fluid from a temperature below said lower temperature by cooling said recombined geothermal stream, means for expanding said gaseous working stream received from said first heat exchanger, transferring its energy into usable form and producing a spent working stream, and a condenser connected to receive said spent working stream and to condense said spent working stream and provide an oncoming liquid working stream.

17. The apparatus of claim 16 wherein said working stream is a multicomponent fluid, and further comprising:
a fourth heat exchanger connected to receive said oncoming liquid working stream from said condenser and said spent working stream and to preheat said oncoming liquid working stream, partially condensing said spent working stream.

18. The method of claim 14 wherein said spent geothermal stream is split into a first substream and a second substream, and said condensing said spent geothermal stream is condensing of said first substream, and further comprising,
expanding said second substream, transforming its energy into usable form, and producing a spent second substream,
heating said working stream from a temperature below said lower temperature by condensing said spent second substream.

19. The apparatus of claim 16 further comprising a stream splitter that splits said spent geothermal stream into a first substream and a second substream, and wherein said spent geothermal stream received by said second heat exchanger is said first substream, and further comprising,
means for expanding said second substream from said stream splitter, transforming its energy into usable form, and producing a spent second substream, and
a fourth heat exchanger connected to receive said spent second substream from said means for expanding said second substream and to receive said working stream at a temperature below said lower temperature, said fourth heat exchanger condensing said spent second substream and heating said working stream at a temperature below said lower temperature.

* * * * *